(12) United States Patent
Zimmer et al.

(10) Patent No.: US 8,348,028 B2
(45) Date of Patent: Jan. 8, 2013

(54) PNEUMATIC DAMPER FOR SLOWING DOWN MOVABLE FURNITURE PARTS

(76) Inventors: Günther Zimmer, Rheinau (DE); Martin Zimmer, Rheinau (DE)

( * ) Notice: Subject to any disclaimer, the term of this patent is extended or adjusted under 35 U.S.C. 154(b) by 1378 days.

(21) Appl. No.: 11/235,596

(22) Filed: Sep. 26, 2005

(65) Prior Publication Data

US 2006/0118371 A1    Jun. 8, 2006

Related U.S. Application Data

(63) Continuation-in-part of application No. PCT/DE2004/000600, filed on Mar. 24, 2004.

(30) Foreign Application Priority Data

Mar. 26, 2003   (DE) .................................. 103 13 659

(51) Int. Cl.
*F16F 9/48*   (2006.01)

(52) U.S. Cl. ..... 188/288; 188/381; 188/134; 267/64.14; 267/201; 267/202; 267/134

(58) Field of Classification Search .................. 188/381, 188/134, 361; 267/64.14, 201, 202, 134
See application file for complete search history.

(56) References Cited

U.S. PATENT DOCUMENTS

| | | | |
|---|---|---|---|
| 2,088,450 A * | 7/1937 | Tea et al. ........................ | 267/201 |
| 4,048,261 A * | 9/1977 | Starmer ........................ | 525/187 |
| 4,765,444 A * | 8/1988 | Bauer et al. .................... | 188/129 |
| 4,819,770 A * | 4/1989 | Hahn ............................. | 188/284 |
| 4,881,723 A * | 11/1989 | Bauer et al. ..................... | 607/91 |
| 4,934,493 A * | 6/1990 | Bauer et al. .................... | 188/381 |
| 5,174,551 A * | 12/1992 | Mintgen ........................ | 267/120 |
| 5,181,589 A * | 1/1993 | Siegner et al. ................ | 188/374 |
| 5,295,564 A * | 3/1994 | Stadelmann .................. | 188/381 |
| 5,549,182 A * | 8/1996 | Ehrnsberger et al. ......... | 188/129 |
| 5,595,268 A * | 1/1997 | Paton ............................. | 188/271 |
| 5,697,477 A * | 12/1997 | Hiramoto et al. ........ | 188/322.18 |
| 5,720,369 A * | 2/1998 | Thorn ............................ | 188/300 |
| 5,884,734 A | 3/1999 | Hiramoto et al. | |
| 6,247,687 B1 * | 6/2001 | Jensen et al. .................. | 267/200 |
| 6,269,919 B1 * | 8/2001 | Bivens et al. ................. | 188/288 |
| 6,290,038 B1 * | 9/2001 | Jensen et al. .................. | 188/381 |
| 6,386,528 B1 * | 5/2002 | Thorn et al. ................... | 267/201 |
| 6,460,839 B2 * | 10/2002 | Muller .......................... | 267/221 |
| 6,520,493 B2 * | 2/2003 | Larsen .......................... | 267/201 |
| 6,615,450 B2 * | 9/2003 | Salice .............................. | 16/85 |
| 6,672,575 B2 * | 1/2004 | Flower et al. ................. | 267/205 |
| 6,968,930 B2 * | 11/2005 | Shibao .................... | 188/322.17 |
| 7,147,216 B2 * | 12/2006 | Gassner et al. ............... | 267/201 |
| 2002/0104722 A1 | 8/2002 | Lutz et al. | |

* cited by examiner

*Primary Examiner* — Robert A Siconolfi
*Assistant Examiner* — James Hsiao
(74) *Attorney, Agent, or Firm* — Klaus J. Bach

(57) ABSTRACT

In a pneumatic damper for slowing down movable furniture parts, comprising a cylinder and a piston movably disposed in the cylinder so as to form a displacement chamber at one side and a vacuum chamber at the other side of the piston, the piston includes a seal element which, in one end position thereof, is in close contact with the wall of the cylinder whose cross-section increases toward the opposite end of the cylinder so that the sealing effect collapses when the piston approaches its other end position and the piston includes a piston rod, which has a diameter of less than 35% of the piston diameter and sealingly extends through a cylinder end wall.

10 Claims, 4 Drawing Sheets

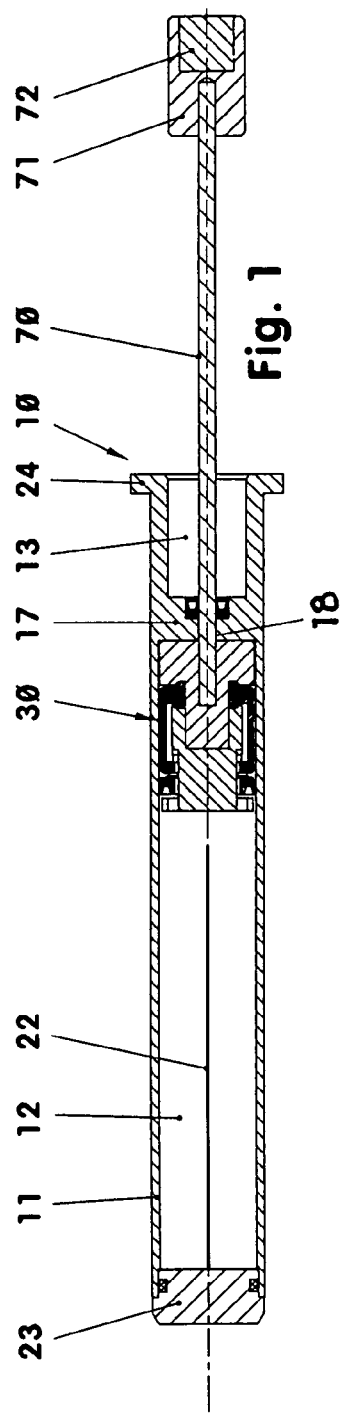
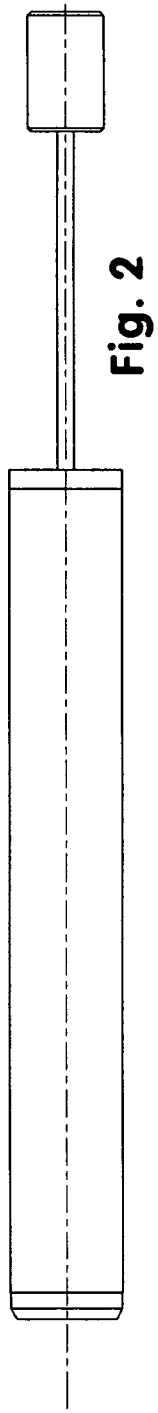
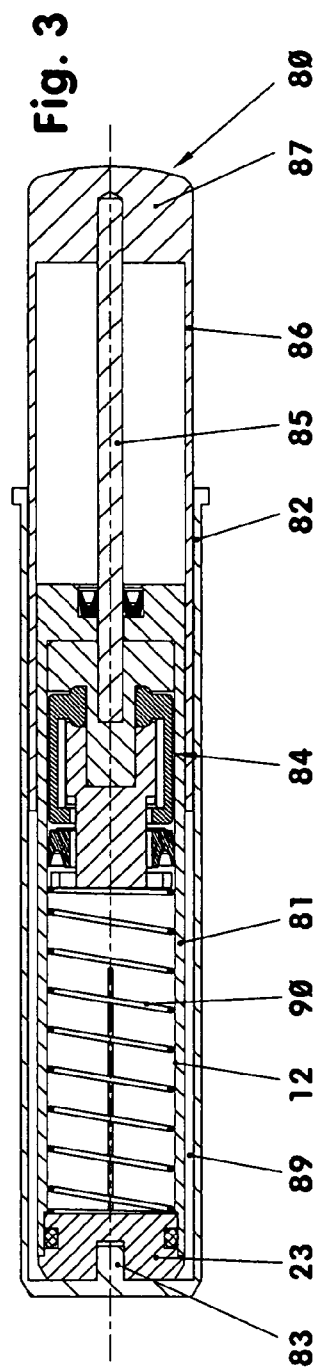

PNEUMATIC DAMPER FOR SLOWING DOWN MOVABLE FURNITURE PARTS

This is a Continuation-In-Part Application of International Application PCT/DE2004/000600 filed Mar. 24, 2004 and claiming the priority of German application 103 13 659.2 filed Mar. 26, 2003.

BACKGROUND OF THE INVENTION

The invention resides in a pneumatic damper for slowing down movable furniture parts, including a cylinder and a piston which is axially movably supported in the cylinder and connected to a piston rod subjected to internal and external forces. The piston includes a seal element acting also as a check valve and divides the cylinder into a vacuum chamber and a compression chamber from which gas can released depending on the direction of a piston stroke. The piston has seal elements which are in contact with the cylinder walls at least in an end position of the piston where it is not subjected to gas pressure. The cross-section of the interior of the cylinder becomes larger at least in parts thereof in a uniform way toward one end position of the piston and the piston is provided with at least one sleeve-like seal element and is disposed in close contact with the cylinder walls at least in the area thereof adjacent the piston rod.

Such a device is disclosed in U.S. Ser. No. 11/168,035 where it is part of a guide system. However the cylinder piston unit disclosed therein operates in the slow-down stroke only against a pressurized air cushion.

EP 1 260 159 A2 discloses another movement damper in which the slow-down forces are generated by compression and vacuum forces. However, with the arrangements described, only a relatively small vacuum can be generated. Furthermore, during the slow-down stroke, the force generated by the vacuum is effective only relatively slowly.

It is therefore the object of the present invention to provide a pneumatic retarding or damper mechanism wherein a retarding effect is rapidly established and wherein the damper is stopped in the end position thereof without a hard impact and without rebound and which furthermore requires only a relatively small amount of space.

SUMMARY OF THE INVENTION

In a pneumatic damper for slowing down movable furniture parts, comprising a cylinder and a piston movably disposed in the cylinder so as to form a displacement chamber on one side and a vacuum chamber on the other side of the piston, the piston includes a seal element which, in one end position thereof, is in close contact with the wall of the cylinder whose cross-section increases toward the opposite end position so that the sealing effect collapses when the piston approaches the other end position The piston includes a piston rod which sealingly extends through an opening in an end wall of the cylinder and has a diameter which is less than 35% of the piston diameter so as to form the displacement chamber at one side of the piston and the vacuum chamber at the opposite side of the piston, the piston having a rest position in the cylinder at one end thereof where also the vacuum chamber is formed.

With the use of a piston rod with only a relatively small diameter, the effective piston surface area at the end of the piston adjacent the piston rod is substantially larger in comparison with the state of the art arrangements whereby the vacuum and displacement chambers can be formed in the cylinder without any increase in construction space. Preferably the piston has a resilient seal sleeve which forms a braking collar engaging the interior cylinder wall so as to cause friction which further increases the slow-down effect.

The invention will become more readily apparent from the following description of a particular embodiment thereof with reference to the accompanying drawings.

BRIEF DESCRIPTION OF THE DRAWINGS

FIG. 1 is a longitudinal cross-sectional view of a pneumatic movement damper according to the invention, FIG. 2 is a side view of the damper shown in FIG. 1, FIG. 3 is a cross-sectional view of the pneumatic damper with a cover sleeve.

DESCRIPTION OF THE PARTICULAR EMBODIMENT

Figure 4:
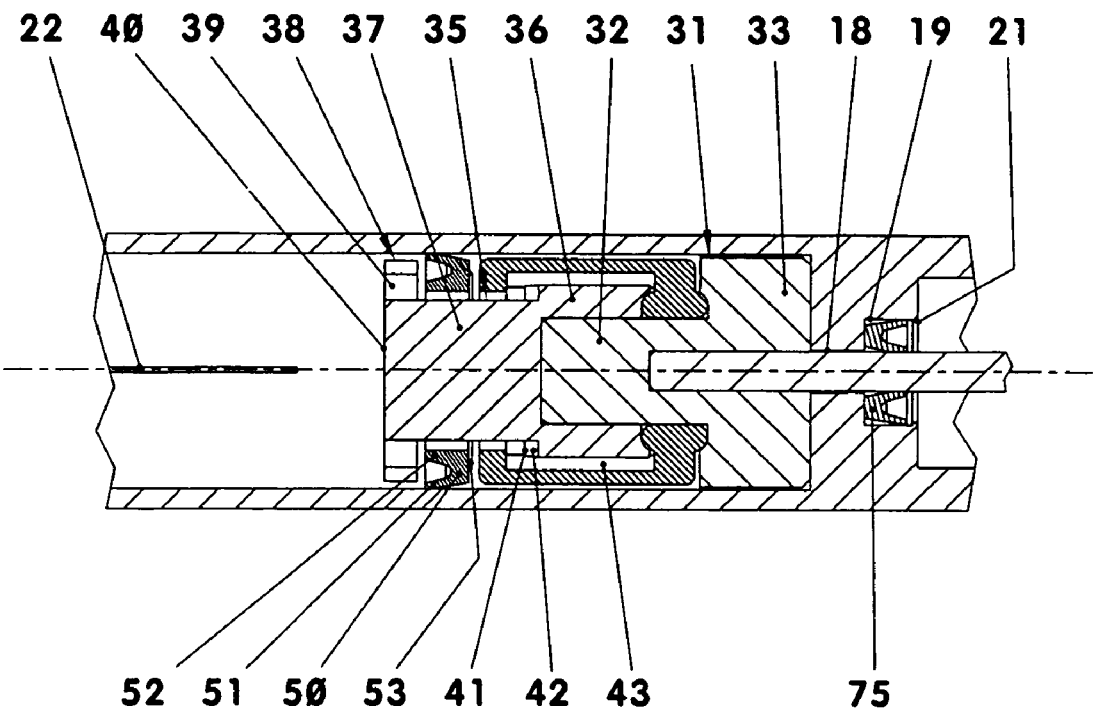
FIG. 4 shows a piston in an expanded end position of the damper in a longitudinal cross-sectional view.

FIGS. 1 and 2 show a movement damper 10 by which for example a drawer is pneumatically slowed down when reaching its closed end position. The retardation device or movement damper is a cylinder-piston unit including a cylinder 11 in which a piston 30 is movably disposed. A piston rod 70 extends from the cylinder 11 and is provided at its free end with a carrier member 71. The carrier member includes for example a bar magnet 72 or another coupling member.

In the installation example mentioned, a cylinder 11 is mounted to the opposite outer side walls of a drawer. The piston rods 70 project for example beyond the rear wall of the drawer. When the drawer is closed, the extended piston rods 70 contact with their carrier members 71 guide stops or the rear wall of a closet. As the piston rods 70 are forced into the cylinders, the drawer is slowed down by the retardation device 10 until the drawer reaches its closed end position. The rod magnets are engaged by the stops or a correspondingly equipped rear wall. Upon opening the drawer, the rods to remain engaged with the stops or rear wall until they are fully extended. The cylinder of this retardation device 10 has generally a diameter in the area of 8 to 15 mm.

FIG. 3 shows another retardation device 80, which is used for example in connection with doors or as flap stoppers of furniture. This retardation device 80 comprises essentially a cylinder 81, a spring-loaded piston 84 and a piston rod 85. However, the end of the piston rod 85 projecting from the cylinder 81 is disposed in a guide cylinder 86. The guide cylinder 81 is provided with an outer sleeve 82 which extends around the guide cylinder 86 with some play at least in the area of the cylinder 81.

As a door stopping device, the retardation device 80 is mounted with its outer sleeve 82 onto a furniture wall. The furniture wall is for example a closet side wall or a divider wall with a front edge which is abutted by the door when the door is closed. The installation of the outer sleeve 82 is so set up that the extended guide sleeve 86 projects beyond the front edge of the side wall or the divider wall of the closet. As the door is closed, it comes into contact with the guide sleeve 86 and moves the guide sleeve inwardly into the space 89 between the outer sleeve 82 and the cylinder 81 while the door is being slowed down.

Upon opening the door, the guide cylinder is again expanded by the return spring 90 installed in the cylinder 81.

In the retardation device according to FIGS. 1 and 2, the cylinder 11 consists of an essentially cylindrical injection molded plastic part with openings 12, 13, which extend from opposite ends into the plastic part and are separated by an intermediate wall 17 including a bore 18. The maximum piston stroke corresponds for example to five times the minimum diameter of the larger diameter left end opening 12.

The left end opening 12 represents the non-cylindrical inner cylinder wall. The cross-section of the cylinder interior becomes slightly larger from the intermediate wall 17 toward the outer end into which a cylinder plug 23 is inserted so that the cylinder interior is truncated-cone shaped.

The truncated cone inclination is, for example, 1:140. Depending on particular embodiments, it may be in the range of 1:5 to 1:250. The cylinder bottom 23 formed by the plug 23 is cemented, thermally welded or pressed into the cylinder 11. Between the cylinder plug 23 and the inner cylinder wall 12, a seal ring is arranged and a throttling groove 22 is formed into the inner cylinder wall 12. It extends for example along a central longitudinal plane and ends a few millimeters ahead of the extended piston 30. The groove 22 forms for example a V-shaped channel or it has a semi-circular cross-section with a pointed edge at the transition with the cylinder wall 11. The cross-section of the V-shaped or semi-circular channel may change over its length. Also, the shape thereof may change over the length of the channel. For a rapid pressure drop over the last millimeters of the piston stroke, a second short throttling groove may be formed into the cylinder wall.

The piston rod end cavity 13 is a parking cavity for accommodating the carrier member 71. In this area, the cylinder 11 ends with a flange-like collar 24 whose diameter is for example 135% of the outer cylinder diameter. The collar 24 is flattened at opposite sides down to the diameter of the cylinder (see FIG. 2).

In the bore 18 of the separating wall 17 which bore is stepped a piston rod seal member 75 is disposed (see also FIG. 4). The seal member is for example a double lip seal member 75 which has outer and inner seal lips 77, 76. Both seal lips 76, 77 are oriented toward the parking recess 13. The inner seal lip 76 extends around the piston rod 70 and the outer seal lip 77 is engaged by a projection 21 in the larger diameter area 19 of the stepped bore 18. The larger diameter area 19 receives the seal member 75 between the end wall thereof and the projection 21 so as to be firmly retained therein. Between the seal member 75 and the cylinder spaces 15, 16 in which the piston 30 is movably disposed the bore 18 has a diameter sized so as to slidably support the piston rod 70.

The piston 30 is composed of two pieces, that is, a piston rod adapter 31 and a seal support member 35. The piston 30 carries two separate piston seal elements 50, 60 arranged in series.

The piston rod adapter 31 consists essentially of two cylindrical sections 32, 33. The section shown in FIG. 4 on the right forms the piston rod side end wall of the piston 30. Its outer diameter is slightly smaller than the smallest inner diameter of the inner cylinder wall 11. The adjacent cylindrical section 32 supports and engages the larger piston seal element 60. The outer diameter of this section 32 is about 46% of the outer diameter of the section 33.

The seal element support section 35 is slipped onto the section 32 of the piston rod adapter 31. The parts 31 and 35 are interconnected by a press fit. If necessary the parts may be cemented together. The outer contour of the seal element support section 35 comprises for example three cylindrical sections 36, 37, 38. The first section 36 extends around the section 32 of the piston rod adapter 31. Its outer diameter is for example 73% of the smallest diameter of the cylinder wall 12. The second intermediate section 37 around which the piston seal element 50 extends has a smaller diameter than either of the two adjacent sections. Its outer diameter is for example 60% of the smallest diameter of the cylinder inner wall 12. The third section 38 is the piston end collar. It has an outer diameter which is slightly smaller than the smallest diameter of the inner cylinder wall 12. The piston end collar 28 includes at least one groove or bore 39 which provides for communication between the opposite sides of the collar 38 that is between the cylinder space 12 and the space 43 surrounding the cylindrical section 37. At the transition between the cylindrical section 37, a shoulder 41 is formed which has at least one radially extending groove 42.

The seal element support section 35 and the piston rod adapter 31 are formed for example by injection molding of a thermoplastic material. The piston rod adapter 31 is injection molded onto the metallic piston rod 70. For firm engagement of the piston rod adapter 31 with the piston rod 70, the piston rod 70 may be flattened at its end or provided with a groove, or another cold deformation may be provided. The diameter of the piston rod 70 is for example 17% of the smallest diameter of the inner cylinder wall 12. Depending on the design, the diameter may be between 15 and 35%.

Figure 6:
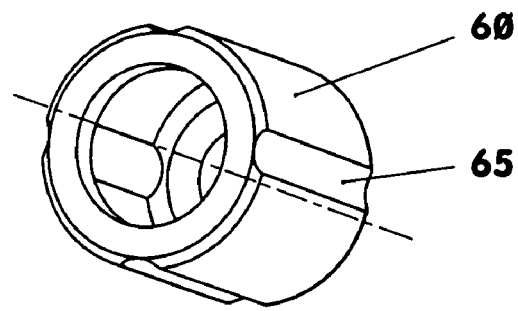
FIG. 6 is a perspective view of a retarding seal element.
Figure 7:
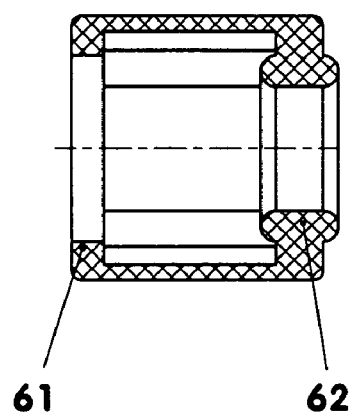
FIG. 7 is an axial cross-sectional view of the seal element shown in FIG. 6.
Figure 8:
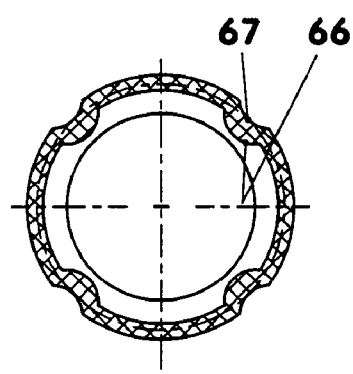
FIG. 8 is a transverse cross-sectional view of the seal element shown in FIG. 6.

Engaged between the piston rod adapter 31 and the seal element support section 35, there is the hose-like piston seal element 60, see FIGS. 6-8. The piston seal element 60, which also acts as a deceleration sleeve, consists of an elastic rubber-like hose which is longer than half its maximum outer diameter. The hose is for example provided at both ends with an inwardly projecting rim forming an internal collar 61, 62. As shown in FIG. 7, the left end collar 61 has an inner diameter which, with the piston seal element 60 being under no load, is larger than the outer diameter of the cylindrical section 37 by at least 10%. This internal collar 61 is not in contact with the cylindrical section 37. The right end collar 62 as shown in FIG. 7 has opposite axial extensions and an enlarged cross-section. In the area of the axial extensions, the right end collar 62 is sealingly and tightly engaged between the piston rod adapter 1 and the seal element support section 35. In the axial contact areas between the piston rod adapter 31 and the seal element support section 35 and the internal collar 62 the parts 31, 35 are provided with annular grooves for improving the seal and retaining effects. The inner diameter of the end collar 62 corresponds to the outer diameter of the section 32.

Alternatively, the piston seal element 60 may be arranged directly on the piston 30 in a gas-tight manner at least in the area of the piston rod end of the piston 30.

When mounted, the piston rod seal element 60 extends over and beyond the section 36 of the piston 30. Then the piston seal element 60 includes at least three, in the example four, longitudinal grooves 65. The longitudinal grooves 65 have inwardly extending longitudinal projections into which the longitudinal grooves 65 are formed—see FIGS. 6 and 8. Instead of longitudinal grooves 65, the outer contour of the piston seal element may be provided with projections or it may be similarly structured.

Between the outer front end of the left internal collar 61 and the piston end collar 38, the piston seal element 50 is arranged. The piston seal element 50 is a double lip seal with axial seal lips 51, 52 oriented toward the cylinder plug 23. The outer seal lip 51 is so dimensioned that it is in contact with the cylinder wall over at least 90% of the piston compression stroke that is over the stroke area ahead of the plug 23. The inner seal lip 52 is not in contact with the surface of the intermediate section 37.

The front face of the seal 50, remote from the seal lips 51, 52, is provided about at the center thereof with an annular web 53 which abuts the adjacent piston seal element 60 during the work stroke. The seal 50 and the seal element 60 may be connected to each other at this point so as to form a single part.

The piston 84 (FIG. 3) of the retardation device 80 is in principle of the same design as the piston 30 of the retardation device 10. However, the embodiment as shown in FIG. 3 has a shorter stroke. In that case, the stroke is only about 2.6 times of the smallest diameter of the cylinder interior wall 12. Between the cylinder end plug 23 and the front wall of the piston, a return spring 90 is disposed in the cylinder 81.

Since during closing of the furniture door transverse forces are effective on the extended part of the retardation device 80, the piston rod 85 is surrounded by a guide sleeve 86. The guide sleeve 86 is supported on the outer sleeve 82 and the outer wall of the cylinder 81. The outer sleeve 82 is therefore for example 14% longer than the outer cylinder wall. Its end wall is provided with a pin 83 which is inserted into the cylinder end plug 23. At the opposite end, the outer sleeve 82 is provided with a small flange which may be used as an installation engagement structure.

The guide sleeve 86 is essentially a tubular body, which at its end extending beyond the outer sleeve 82 is provided with a cylindrical cap 87. The cylindrical cap 87 has a spherically curved end face. The radius of the curved end face is for example one and a half times the outer diameter of the guide sleeve 86. In order to avoid undesired braking effects when the guide sleeve 86 enters the outer sleeve 82 by the displacement of air in the gap 89 between the cylinder 81 and the outer sleeve 82, the gap 89 is at least 14% longer than the piston stroke.

Figure 5:
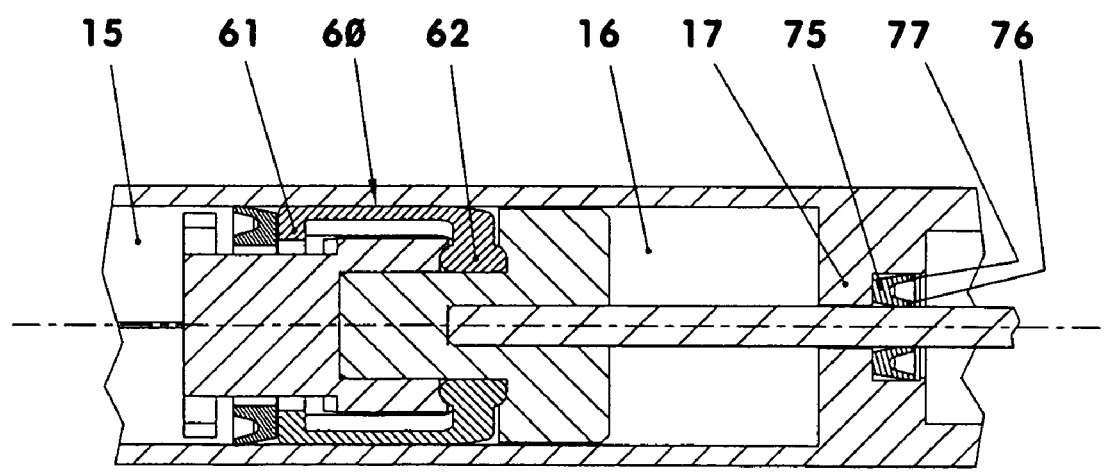
FIG. 5 shows the arrangement of FIG. 4 with the piston displaced from the end position shown in FIG. 4.
Figure 9:
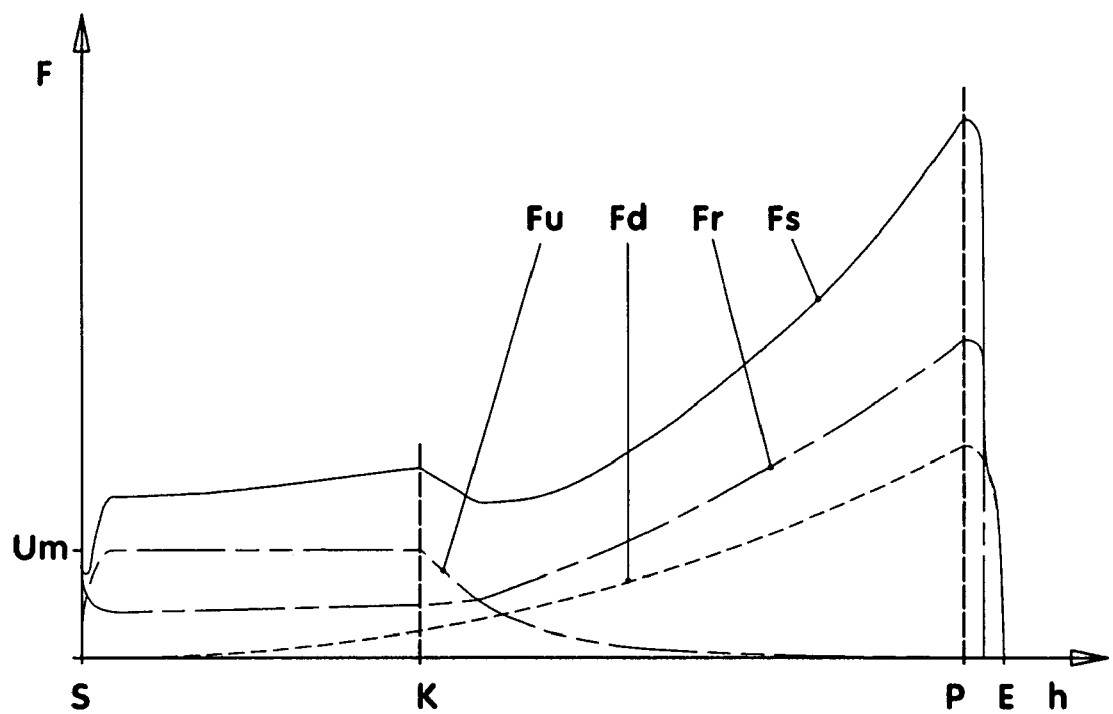
FIG. 9 is a force-travel distance diagram for the pneumatic damper.

FIG. 9 shows a diagram in which the retardation force (F) is plotted over the piston stroke (h) for the embodiments shown in FIGS. 1, 4 and 5. The piston stroke indicated on the abscissa starts at point (S) and end upon reaching the maximum piston stroke at the end point (E). In the cylinder-piston unit pressure dependent forces Fd, vacuum forces (Fu) and friction forces (Fr) occur. The sum of these forces is designated by Fs.

When the retardation device is subjected to a load in the working stroke, a pressure is generated in the displacement chamber 15 ahead of the piston 30. This pressure increases continuously up to the release point (P) of the piston stroke. At the release point P, the outer seal lip 51 lifts off the cylinder wall 12. At this point, or in the vicinity of this point the inner diameter of the cylinder wall 12 becomes so large as the cylinder widens that the lip 51 no longer remains in contact with the cylinder wall. The compressed air then flows from the cylinder chamber 15 between the retardation sleeve 60 and the cylinder wall to the vacuum chamber 16. First, the air flows only through the longitudinal grooves 65 (see FIG. 6). About at the same time, at which the air is released from the space 43, the retardation sleeve contracts and moves away from the cylinder wall 12 primarily because of a contraction of the elastic sleeve material which had been expanded by the pressurized air (see FIG. 4). Consequently, the friction force Fr effective between the sleeve and the cylinder wall drops essentially to zero.

At the beginning of the working stroke, a maximum vacuum (Um) is rapidly built up in the vacuum chamber 16. The vacuum is built up so rapidly because only a little rest air volume is left in the vacuum chamber 16. When the piston is fully extended, the air volume in the vacuum space comprises only a few cubic millimeters. The corresponding vacuum and the pressure forming in the displacement chamber 15 bias the braking sleeve 60 into engagement with the cylinder wall 12, see FIG. 5. Upon reaching the point K on the diagram abscissa, some air can flow through the throttling groove 22 formed into the cylinder wall 12 (see FIG. 1) past the lip seal 50 and through the grooves 65 in the sleeve-like retardation element 60 to the vacuum chamber 16. As a result, the curve Fu drops down to zero beginning at this point.

The friction force Fr generated primarily by the friction caused by the engagement of the retardation sleeve with the cylinder wall becomes first smaller when the piston 30 moves into the cylinder because of the transition from static friction to kinetic friction. The lowest point of the curve Fr is reached shortly after the beginning of the stroke since the vacuum in the vacuum chamber 16 is already fully effective at this point. The friction force increases with increasing pressure in the displacement chamber 15 up to the area of the intersection between the curves Fu and Fd. From hereon, the friction force Fr increases proportionally with the pressure increase in the displacement chamber 15. After the point P, the friction force rapidly decreases as already mentioned.

Preferably, the surfaces of the piston seal elements (50, 60) include compounds which are different from the seal material. Such compounds are preferably halogens which are chemically bonded to, or physically implanted into, the seal surfaces. The seal element material is preferably nitrile-butadien rubber to which the halogens are chemically bonded.

What is claimed is:

1. A pneumatic damper for slowing down movable furniture parts, comprising a cylinder (11, 81) with a cylinder wall (12), a piston (30) movably supported, and axially guided, in said cylinder (11, 81) and including a piston rod (70, 85) having a diameter of less than 35% of the diameter of said piston (30) and extending from one end of said cylinder (11, 81) through a guide opening (18), in which said piston rod (70, 85) is sealingly supported, said piston (30) having a rest position at said one end of said cylinder and dividing said cylinder (11, 81) into a vacuum chamber (16) at the side of the piston adjacent said one end of the cylinder (11, 81) and a displacement chamber (15) at the opposite side of the piston (30), said piston (30) being void of any throttling passages and including circumferential sealing and elastic sleeve elements (50, 60), which are in contact with the cylinder wall (12) in said rest position of the piston (30) such that the vacuum chamber (16) and the displacement chamber (15) are sealed from each other, said sealing and elastic sleeve elements (50, 60) permitting pneumatic fluid flow only from the vacuum chamber (16) at one side of the piston (30) to the displacement chamber (15) at the other side of the piston (30) when the piston (30) is moved back to its rest position, and said sealing and elastic sleeve elements (50, 60) including an elastic sleeve (60), whose interior is in communication with said displacement chamber (15) for biasing said elastic sleeve (60) into contact with the cylinder wall (12) for generating friction forces retarding the movement of the piston (30) while the fluid in the displacement chamber (15) is under pressure, said cylinder (11, 81) having a diameter which increases from the rest position of said piston (30) in which said sealing elements (50, 60) are in contact with the cylinder wall (12) toward the opposite end thereof, so that a vacuum is rapidly generated in the vacuum chamber (16) at said one side of the piston as said piston is moved out of its rest position while the fluid in said displacement chamber (15) is compressed, but pressurized fluid is released from the displacement chamber (15) as the piston approaches the end of the displacement chamber (15) opposite the rest position of the piston (30) where the cylinder (11, 81) has an increased diameter so that the piston sealing and elastic sleeve elements (50, 60) are no longer in sealing contact with the cylinder wall.

2. A pneumatic damper according to claim 1, wherein at least one of said piston (30) and said cylinder wall (12) includes means permitting a leakage flow between the displacement chamber (15) and the vacuum chamber (16) past the piston (30).

3. A pneumatic damper according to claim 1, wherein the elastic sleeve element (60) of said piston (30) which is in contact with said cylinder wall (12) is longer than ½ of the outer diameter of the piston (30).

4. A pneumatic damper according to claim 1, wherein the diameter of the cylinder chambers (15, 16) differ by not more than 5%.

5. A pneumatic damper according to claim 1, wherein the pressure chamber (15) and the vacuum chamber (16) are in communication with each other via a throttling groove (22) formed in the cylinder wall (12) when the piston (30, 83) reaches the throttling groove (22).

6. A pneumatic damper according to claim 1, wherein the surfaces the piston seal element which are in contact with the cylinder wall (12) include compounds which are different from the seal material and which are one of chemically bonded to, and physically deposited in, the seal material.

7. A pneumatic damper according to claim 6, wherein said compounds are halogens.

8. A pneumatic damper according to claim 1, wherein the displacement chamber (15) is disposed in the area of the cylinder (11, 81) remote from the piston rod (70, 85).

9. A pneumatic damper according to claim 7, wherein the seal elements (50, 60, 75) consist of nitrile-butadien rubber with the whole surface thereof being provided with halogens chemically bonded thereto.

10. A pneumatic damper according to claim 1, wherein the piston seal element (60) is provided at its outer circumference with at least one longitudinal groove (67).

* * * * *